(12) United States Patent
Kajiya

(10) Patent No.: US 8,328,608 B2
(45) Date of Patent: Dec. 11, 2012

(54) AIR CONDITIONER FOR VEHICLE

(75) Inventor: Kei Kajiya, Kariya (JP)

(73) Assignee: Denso Corporation, Kariya (JP)

( * ) Notice: Subject to any disclaimer, the term of this patent is extended or adjusted under 35 U.S.C. 154(b) by 600 days.

(21) Appl. No.: 12/462,564

(22) Filed: Aug. 5, 2009

(65) Prior Publication Data

US 2010/0035534 A1 Feb. 11, 2010

(30) Foreign Application Priority Data

Aug. 8, 2008 (JP) ................. 2008-205141

(51) Int. Cl.
*B60H 1/00* (2006.01)
(52) U.S. Cl. ...................................... 454/141
(58) Field of Classification Search .................. 454/141, 454/121, 202, 203, 205, 210, 218
See application file for complete search history.

(56) References Cited

U.S. PATENT DOCUMENTS

| | | | |
|---|---|---|---|
| 5,699,960 A | | 12/1997 | Uchida et al. |
| 6,135,201 A | * | 10/2000 | Nonoyama et al. ........... 165/202 |
| 6,138,749 A | * | 10/2000 | Kawai et al. ................. 165/204 |
| 6,142,864 A | * | 11/2000 | Uemura et al. ............... 454/121 |
| 6,253,841 B1 | * | 7/2001 | Obara et al. .................. 165/204 |
| 6,959,754 B2 | * | 11/2005 | Lee et al. ......................... 165/42 |
| 8,074,709 B2 | * | 12/2011 | Park et al. ..................... 165/202 |
| 2006/0260783 A1 | * | 11/2006 | Park et al. ........................ 165/42 |

FOREIGN PATENT DOCUMENTS

| | | |
|---|---|---|
| JP | 08-318727 | 12/1996 |
| JP | 10-109516 | 4/1998 |
| JP | 10-291408 | 11/1998 |
| JP | 11-157321 | 6/1999 |
| JP | 2000-127748 | 5/2000 |

OTHER PUBLICATIONS

Office Action dated May 25, 2010 in Japanese Application No. 2008-205141 with English translation thereof.
Second Office Action in corresponding Chinese patent application No. 2009 1016 6024.3 dated Sep. 14, 2011.

* cited by examiner

*Primary Examiner* — Steven B McAllister
*Assistant Examiner* — Samantha Miller
(74) *Attorney, Agent, or Firm* — Harness, Dickey & Pierce, PLC

(57) ABSTRACT

An air conditioner for a vehicle includes first and second fans driven and rotated by a driving source, and a case defining a first air introduction portion and a second air introduction portion from which at least one of inside air and outside air is introduced. The first fan and the second fan are arranged on a single common axis, and the first air introduction portion and the second air introduction portion are arranged at one side of the first and second fans. The case has therein a first air passage extending from the first air introduction portion to the first fan, and a second air passage extending from the second air introduction portion to the second fan, and the first air passage and the second air passage are provided to be partitioned from each other.

13 Claims, 5 Drawing Sheets

AIR CONDITIONER FOR VEHICLE

CROSS REFERENCE TO RELATED APPLICATION

This application is based on Japanese Patent Application No. 2008-205141 filed on Aug. 8, 2008, the contents of which are incorporated herein by reference in its entirety.

FIELD OF THE INVENTION

The present invention relates to an air conditioner for a vehicle, in which first and second fans are arranged on a single common axis.

BACKGROUND OF THE INVENTION

Conventionally, a vehicle air conditioner is described in JP 8-318727A (corresponding to U.S. Pat. No. 5,699,960). In the vehicle air conditioner, first and second fans are arranged in a top-bottom direction, such that the first fan is positioned above the second fan, and the second fan is positioned under the first fan. The first fan has an air suction port opened toward an upper side in the top-bottom direction, and the second fan has an air suction port opened toward a lower side in the top-bottom direction.

The vehicle air conditioner includes an inside/outside air switching box that is configured to selectively introduce inside air or/and outside air into the first and second fans. The inside/outside air switching box is provided with a single outside air introduction port and first and second inside air introduction ports. More specifically, the outside air introduction port and the first inside air introduction port are provided at an upper side position of the air suction port of the first fan, and the second inside air introduction port is provided at a lower side position of the air suction port of the second fan.

Furthermore, the inside/outside air switching box has therein a first air passage extending from the outside air introduction port and the first inside air introduction port toward the first fan, a second air passage extending from the second inside air introduction port toward the second fan, and a communication passage. The communication passage is provided to bypass the fan casings of the first and second fans, such that the second air passage communicates with the first air passage via the communication passage.

A first door is located in the first air passage to selectively open and close the outside air introduction port and the first inside air introduction port, and a second door is located in the second air passage to selectively open and close the second inside air introduction port and the communication passage.

In an outside air introduction mode in which outside air is blown by both the first and second fans, the first door fully opens the outside air introduction port and fully closes the first inside air introduction port, and the second door fully closes the second inside air introduction port and fully opens an open portion of the communication passage on a side of the second air passage.

Thus, in the outside air introduction mode, the outside air introduced from the outside air introduction port into the first air passage is branched into a flow of outside air flowing to the air suction port of the first fan and a flow of outside air flowing to the communication passage, and the outside air flowing into the communication passage flows into the air suction port of the second fan via the second air passage.

In an inside air introduction mode in which inside air is blown by both the first and second fans, the first door fully closes the outside air introduction port and fully opens the first inside air introduction port, and the second door fully opens the second inside air introduction port and fully closes the open portion of the communication passage on a side of the second air passage.

Thus, inside air introduced from the first inside air introduction port into the first air passage flows to the air suction port of the first fan, and inside air introduced from the second inside air introduction port flows to the air suction port of the second fan, in the inside air introduction mode.

Furthermore, in an inside/outside air double-layer mode in which outside air is blown by the first fan and inside air is blown by the second fan, the first door fully opens the outside air introduction port and fully closes the first inside air introduction port, and the second door fully opens the second inside air introduction port and fully closes the open portion of the communication passage on a side of the second air passage.

Thus, outside air introduced from the outside air introduction port into the first air passage flows to the air suction port of the first fan, and inside air introduced from the second inside air introduction port into the second air passage flows to the air suction port of the second fan, in the inside/outside air double-layer mode.

However, in the vehicle air conditioner, because the outside air is introduced to a lower side of the second fan via the communication passage while bypassing the fan casings of the first and second fans in the outside air mode, air suction resistance in the second fan is increased.

SUMMARY OF THE INVENTION

In view of the foregoing problems, it is an object of the present invention to reduce an air suction resistance in an air conditioner for a vehicle, which includes first and second fans arranged in a single common axis.

According to an aspect of the present invention, an air conditioner for a vehicle includes a blower having first and second fans driven and rotated by a driving source, and a case defining a first air introduction portion and a second air introduction portion from which at least one of inside air inside a vehicle compartment and outside air outside the vehicle compartment is introduced. In the air conditioner for a vehicle, the first fan and the second fan are arranged on a single common axis, the first air introduction portion and the second air introduction portion are arranged at one side of the first and second fans, the case has therein a first air passage extending from the first air introduction portion to the first fan and a second air passage extending from the second air introduction portion to the second fan, and the first air passage and the second air passage are provided to be partitioned from each other. Accordingly, it is possible to form the second air passage without being largely turned around the first and second fans, thereby reducing air suction resistance of the second fan.

Here, the meaning that "the first air passage and the second air passage are partitioned from each other" means not only that "the first air passage and the second air passage are completely and strictly partitioned from each other", but also that "the first air passage and the second air passage are substantially partitioned from each other". Thus, the meaning that "the first air passage and the second air passage are partitioned from each other" includes a little clearance between the first air passage and the second air passage, through which the first air passage and the second air passage communicate with each other.

For example, the case of the air conditioner may be arranged inside of an instrument panel of the vehicle, such that the first and second air introduction ports are arranged at an upper side of the first and second fans. Furthermore, the first air passage and the second air passage may be arranged adjacent to each other in an arrangement direction, and a filter for cleaning air passing therethrough may be located to cross both the first air passage and the second air passage. The first and second air introduction portions may be arranged in a vehicle left-right direction or may be arranged in a vehicle front-rear direction, for example.

The first air introduction portion may be configured by a first outside air introduction port for introducing the outside air and a first inside air introduction port for introducing the inside air, and the second air introduction portion may be configured by a second outside air introduction port for introducing the outside air and a second inside air introduction port for introducing the inside air. In this case, a first door can be located in the first air passage to selectively open and close the first outside air introduction port and the first inside air introduction port, and a second door can be located in the second air passage to selectively open and close the second outside air introduction port and the second inside air introduction port. The first and second doors may be rotary doors, plate doors or slide doors, for example.

Each of the first and second fans may be one-side air suction fan configured to draw air from one side of the fan in the axial direction. In this case, the first fan can be located in a first casing having an air suction port opened into the first air passage, from which air is drawn from the one side of the first fan in the axial direction, and the first air passage may extend approximately straightly from the first air introduction portion to the air suction port of the first casing. Furthermore, the second fan can be located in a second casing having an air suction port opened into the second air passage, from which air is drawn from the one side of the second fan in the axial direction, and the second air passage extends approximately straightly from the second air introduction portion to the second casing via a space radially outside of the first casing, and is bent radially inside between the first casing and the second casing in the axial direction toward the air suction port of the second casing.

Alternatively, each of the first and second fans may be two-sides air suction fan configured to draw air from two sides of each fan in the axial direction. In this case, the first fan can be located in a first casing having two air suction ports opened into the first air passage, from which air is drawn from the two sides of the first fan in the axial direction, and the first air passage extends approximately straightly from the first air introduction portion to the first fan. Furthermore, the second fan is located in a second casing having two air suction ports opened into the second air passage, from which air is drawn from the two sides of the second fan in the axial direction, and the second air passage extends approximately straightly from the second air introduction portion to a radial outside of the second casing, via a space radially outside of the first casing, and is bent radially inside toward the two air suction ports of the second casing.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
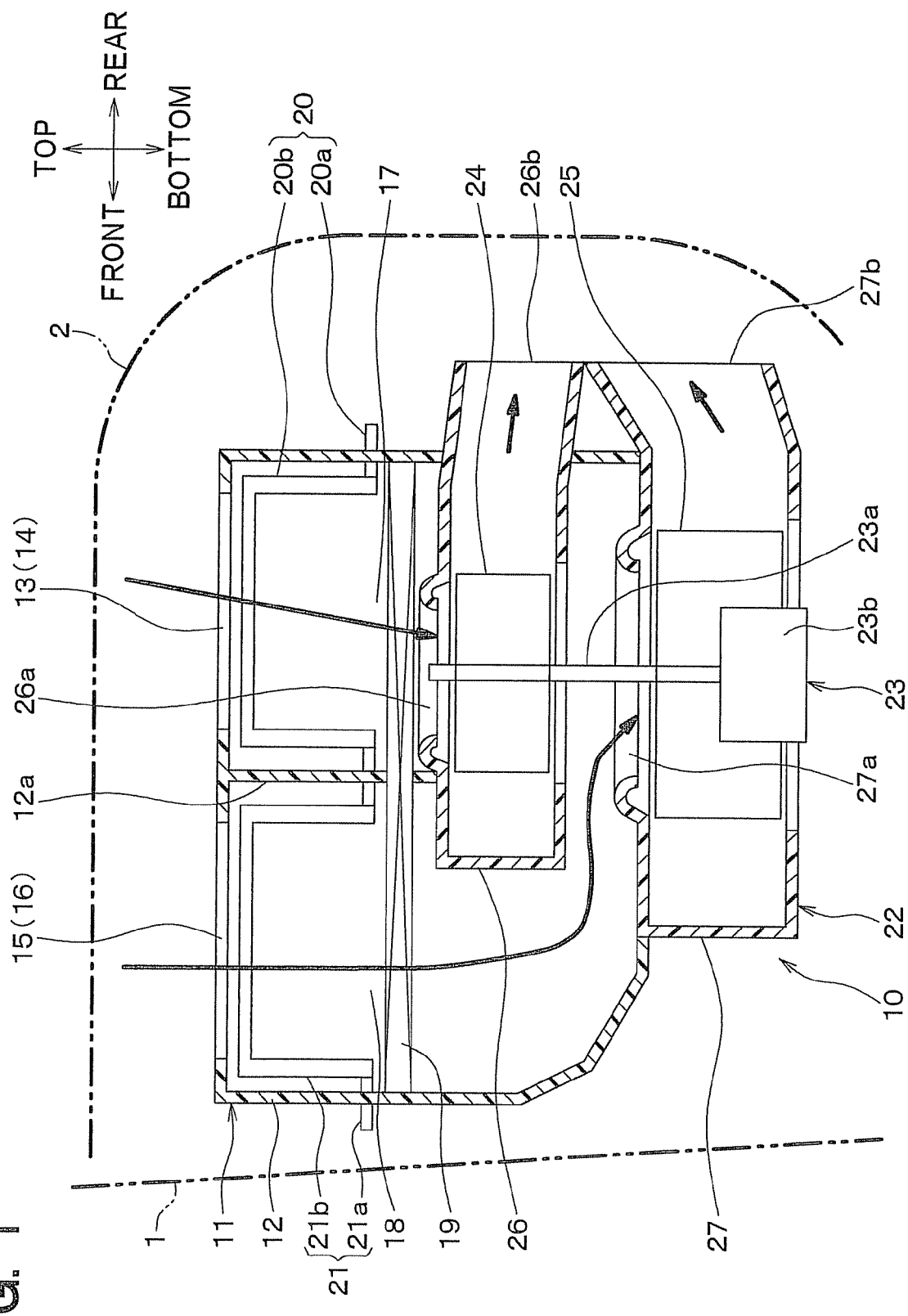
FIG. 1 is a schematic sectional view showing a part of a vehicle air conditioner according to a first embodiment of the present invention.
Figure 2:
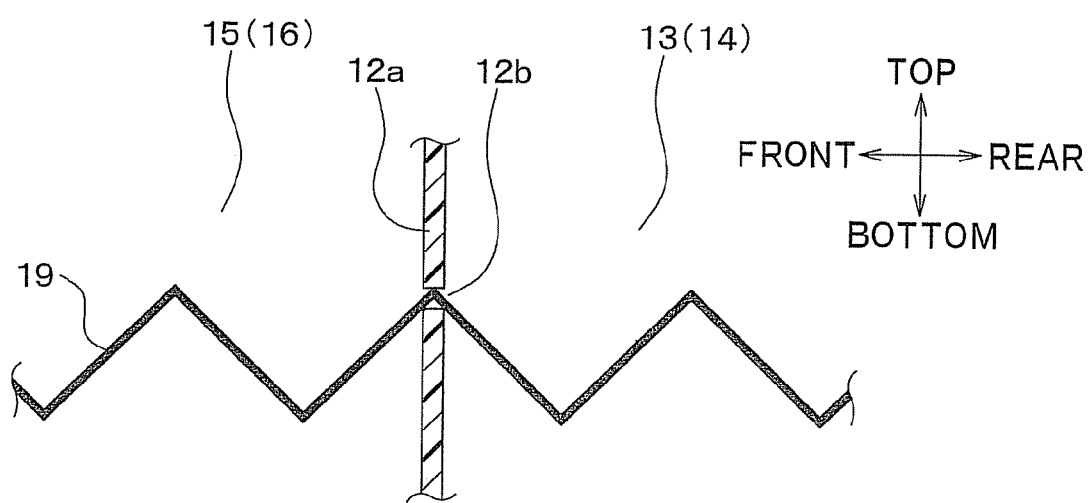
FIG. 2 is a partially enlarged sectional view showing a partition wall at a position adjacent to a filter in the vehicle air conditioner shown in FIG. 1.

An air conditioner for a vehicle according to a first embodiment of the present invention will be described with reference to FIGS. 1 and 2. FIGS. 1 and 2 show the vehicle air conditioner in a state mounted to the vehicle, in a vehicle top-bottom direction and a vehicle front-rear direction.

The vehicle air conditioner includes an interior unit located in a vehicle compartment (i.e., passenger compartment) at a most front portion. The interior unit of the vehicle air conditioner is located inside of the vehicle compartment within an arrangement space between a dash panel 1 and an instrument panel 2. The dash panel 1 is provided in the vehicle to partition the vehicle compartment and an engine compartment from each other. The interior unit of the vehicle air conditioner includes a blower unit 10 for blowing air toward the vehicle compartment, and an air conditioning unit (not shown) for adjusting temperature of air blown by the blower unit 10. For example, the air conditioning unit is located approximately in the arrangement space of the vehicle compartment at a center portion in a vehicle width direction (i.e., vehicle left-right direction), and the blower unit 10 is located to be offset from the air conditioning unit to a front-passenger's seat side in the vehicle left-right direction.

An upper end portion of the instrument panel 2 is fixed to the dash panel 1 to closely contact the dash panel 1, and a lower end portion of the instrument panel 2 is spaced from the dash panel 1. Thus, a lower side of the arrangement space between the dash panel 1 and the instrument panel 2 is opened to an occupancy space in the vehicle compartment. The occupancy space is positioned at a vehicle rear side of the arrangement space relative to the instrument panel 2, in the vehicle compartment.

An air passage, through which air blown by the blower unit flows to the occupancy space of the vehicle compartment, is provided in the air conditioning unit. The air conditioning unit includes a cooling heat exchanger located in the air passage to cool air passing therethrough, a heating heat exchanger located to heat air after passing through the cooling heat exchanger, and an air mix door configured to adjust a flow ratio of an air amount passing through the heating heat exchanger and an air amount bypassing the heating heat exchanger.

For example, the cooling heat exchanger is an evaporator of a vapor-compression refrigeration cycle, and the heating heat exchanger is a heater core for heating air by using engine coolant as a heating source. An open degree of the air mix door can be continuously adjusted, so that the a flow ratio of the air amount passing through the heating heat exchanger and the air amount bypassing the heating heat exchanger can be adjusted. Therefore, the air mix door is a temperature adjustment portion configured to adjust the temperature of air to be blown to the occupancy space of the vehicle compartment.

The air conditioning unit is provided with plural opening portions at its downstream end side such that conditioned air is blown to the occupancy space in the vehicle compartment via the downstream opening portions. More specifically, plural air outlets such as a face air outlet, a foot air outlet and a defroster air outlet are provided in the instrument panel, so that the conditioned air from the downstream opening portions of the air conditioning unit can be directly blown into the occupancy space from at least one of the air outlets via ducts. Here, the face air outlet is provided for blowing the conditioned air of the air conditioning unit toward the face portion of a passenger in the occupancy space of the vehicle compartment, the foot air outlet is provided for blowing the conditioned air toward the foot portion of a passenger in the occupancy space of the vehicle compartment, and the defroster air outlet is provided for blowing the conditioned air toward an inner surface of the windshield of the vehicle.

As shown in FIG. 1, the blower unit 10 includes an inside/outside air switching device 11 configured to selectively switch inside air and outside air, and an electrical blower 22 configured to blow the air introduced from the inside/outside air switching device 11 to the air conditioning unit. The inside/outside air switching device 11 is integrated with the electrical blower 22 so as to form the blower unit 10. In the example of the blower unit 10 shown in FIG. 1, the inside/outside air switching device 11 is located at an upper side of the electrical blower 22, and the electrical blower 22 is located at a lower side of the inside/outside air switching device 11.

The inside/outside air switching device 11 includes a case 12 made of a resin material having an elasticity and a high strength, such as polypropylene.

The case 12 is configured by integrally fastening plural divisional case members after various components are assembled into the case 12. The divisional case members are respectively molded by using the resin material.

A first air introduction portion (13, 14) and a second air introduction portion (15, 16) from which inside air (i.e., air inside the vehicle compartment) and outside air (i.e., air outside the vehicle compartment) are introduced are provided at an upper portion in the case 12. In the present embodiment, the first air introduction portion is configured by both a first outside air introduction port 13 from which outside air is introduced into the case 12, and a first inside air introduction port 14 from which inside air is introduced into the case 12.

The second air introduction portion is configured by both a second outside air introduction port 15 from which outside air is introduced into the case 12, and a second inside air introduction port 16 from which inside air is introduced into the case 12. Both the first and second outside air introduction ports 13, 15 communicate with an open hole of the dash panel opened to outside.

In the example of FIG. 1, the second outside air introduction port 15 and the second inside air introduction port 16 are arranged at a vehicle front side of the first outside air introduction port 13 and the first inside air introduction port 14. In addition, the first inside air introduction port 14 is arranged at a vehicle right side of the first outside air introduction port 13 in the vehicle left-right direction, and the second inside air introduction port 16 is arranged at a vehicle right side of the second outside air introduction port 15 in the vehicle left-right direction.

A partition wall 12a is formed to extend from an upper wall surface of the case 12 downwardly and to partition the inner space of the case 12 into front and rear space parts, thereby forming a first air passage 17 and a second air passage 18 in the case 12 by respectively using the front and rear space parts. The first air passage 17 is provided such that outside air introduced from the first outside air introduction port 13 and inside air introduced from the first inside air introduction port 14 can flow to the blower 22 via the first air passage 17, and outside air introduced from the second outside air introduction port 15 and inside air introduced from the inside air introduction port 16 can flow to the blower 22 via the second air passage 18.

Thus, the first air passage 17 and the second air passage 18 are arranged adjacent to each other in the vehicle front-rear direction. A filter 19 is located in the case 12 to cross both the first and second air passages 17, 18, so as to remove dust or the like contained in air flowing from the first and second outside air introduction ports 13, 15 and the first and second inside air introduction ports 14, 16.

FIG. 2 is an enlarged view showing a part of the partition wall 12a and the filter 19. A slit hole 12b is a through hole formed in the partition wall 12a to penetrate through the partition wall 12a. As shown in FIG. 2, the filter 19 penetrates through the slit hole 12b of the partition wall 12a so as to be arranged in both the first and second air passages 17, 18. When the filter 19 is assembled to the case 12, the filter 19 is inserted into the slit hole 12b of the partition wall 12a and is slid in the vehicle left-right direction (paper face-back direction in FIG. 2).

The filter 19 is formed into a wave shape by using a base material such as a filter material or a nonwoven metal. The slit hole 12b provided in the partition wall 12a is made thin to be approximately equal to the thickness of the base material. Therefore, an air amount flowing between the first and second air passages 17 and 18 via the slit hole 12b can be reduced. Thus, the first air passage 17 and the second air passage 18 are substantially partitioned from each other to be formed independently.

A first door 20 is located in the first air passage 17 to selectively open and close the first outside air introduction port 13 and the first inside air introduction port 14. Similarly, a second door 21 is located in the second air passage 18 to selectively open and close the second outside air introduction port 15 and the second inside air introduction port 16.

In the present embodiment, each of the first and second doors 20, 21 is a rotary door and is formed by using a resin material similar to the case 12. The first door 20 includes a rotary shaft 20a rotatably supported in the case 12, a door body portion 20b rotated integrally with the rotary shaft 20a. As shown in FIG. 1, the rotary shaft 20a is located at two sides of the door body portion 20b. Furthermore, the door body portion 20b includes a curved door surface of an approximately circular arc shape spaced from the rotation axial line of the rotary shaft 20a, and two side plates connecting two axial end portions of the curved door surface and the rotary shaft 20a at two axial sides.

Similarly, the second door 21 includes a rotary shaft 21a rotatably supported in the case 12, a door body portion 21b rotated integrally with the rotary shaft 21a. As shown in FIG. 1, the rotary shaft 21a is located at two sides of the door body portion 21b. Furthermore, the door body portion 21b includes a curved door surface of an approximately circular-arc shape spaced from the rotation axial line of the rotary shaft 21a, and two side plates connecting two axial end portions of the curved door surface and the rotary shaft 21a at two axial sides.

A seal member is located on an outer peripheral end portion of each of the door body portions 20b, 21b so as to contact a seal surface provided in an open peripheral portion of the air introduction port 13, 14, 15, 16 when the door 20, 21 closes the air introduction port 13, 14, 15, 16. The seal member may be made of a packing member using an elastic material such as a thermoplastic elastomer, an urethane foam, or the like.

The rotation shafts 20a, 21a of the first and second doors 20, 21 are connected to a servomotor (not shown), and the operation of the servomotor is controlled by using a control signal output from an air-conditioning controller (A/C ECU).

The blower 22 is a centrifugal blower that includes a single common electrical motor 23, and the first and second fans 24, 25 rotated by using the common single electrical motor 23. In the present embodiment, the electrical motor 23 is a one-side axial motor including a rotation shaft 23a extending to one direction from a motor body portion 23b. In the example of FIG. 1, the axial direction of the rotation shaft 23a of the blower 22 extends from the motor body portion 23b upwardly in the top-down direction.

As the electrical motor 23, a DC motor or an AC motor may be used. The operation of the electrical motor 23 is controlled by a control signal (e.g., control voltage signal or a control pulse signal) output from the air-conditioning controller.

The first and second fans 24, 25 are centrifugal fans rotated by the single common rotation shaft. A plurality of blades are located circularly around the rotation shaft 23a at a predetermined instant in each of the first and second fans 24, 25. Therefore, the first and second fans 24, 25 are arranged on the same axial line.

The first fan 24 and the second fan 25 are respectively accommodated in first and second scroll casings 26, 27 to be rotatable therein. The first casing 26 and the second casing 27 are made of the same material as the case 12 of the inside/outside air switching device 11, and is connected integrally by using a fastening means such as a metal spring, a clip, a screw member or by using a bonding means such as welding or bonding.

The first casing 26 has therein a scroll air passage in which air blown by the first fan 24 flows, and the scroll radius (a distance from the rotation shaft 23a) of the scroll air passage is gradually enlarged as toward the rotational direction of the first fan 24.

A circular first air suction port 26a is provided in a wall surface of the first casing 26 on a side opposite to the electrical motor 23 in the axial direction. That is, the first air suction port 26a is open in the first air passage 17 adjacent to the filter 19 so that the air in the first air passage 17 can be directly introduced into the first air suction port 26a. The peripheral portion of the first air suction port 26a is formed into a bell mouth shape that is generally known. A first air blowing outlet 26b for blowing air is provided at a winding end side of the scroll air passage of the first casing 26.

The second casing 27 has therein a scroll air passage in which air blown by the second fan 25 flows. The basic structure of the second casing 27 is similar to that of the first casing 26. Therefore, the second casing 27 has a second air suction port 27a and a second air blowing outlet 27b, similarly to those of the first casing 26.

The second fan 25 is arranged on a side of the electrical motor 23 than the first fan 24, and the second air suction port 27a is open in the axial direction of the rotation shaft 23a toward the first casing 26. The first air suction port 26a is arranged directly below of the first outside air introduction port 13 and the first inside air introduction port 14. Therefore, the first air passage 17 extents approximately in a straight line downwardly from the first outside air introduction port 13 and the first inside air introduction port 14 to the first air suction port 26a of the first blower 26.

The second casing 27 is arranged to be offset to the vehicle front side more than the first casing 26, such that the outer periphery of the second air suction port 27a is positioned radially outside of the outer periphery of the first air suction port 26a, relative to the rotation center. Thus, the second air passage 18 approximately extends straightly downwardly from the second outside air introduction port 15 and the second inside air introduction port 16 at one side (i.e., vehicle front side) of the first casing 26, and then is bent radially inside between the first casing 26 and the second casing 27 in the axial direction. That is, the second air passage 18 extends approximately straightly without being largely turned at the front side of the first and second fans 24, 25.

Next, operation of the vehicle air conditioner according to the present embodiment will be described. When the vehicle air conditioner is operated, the air-conditioning controller outputs a control signal to the electrical motor 23, so that the electrical motor 23 is rotated. Thus, the first and second fans 24, 25 are rotated by a rotation driving force from the electrical motor 23, so as to blow air into the vehicle compartment.

Specifically, air drawn from the first air suction port 26a in the axial direction is blown by the first fan 24 to radially outside, and flows to the air conditioning unit from the first air blowing outlet 26b. Similarly, air drawn from the second air suction port 27a in the axial direction is blown by the second fan 25 to radially outside, and flows to the air conditioning unit from the second air blowing outlet 27b.

The air-conditioning controller determines an air introduction mode such as an inside air mode, an outside air mode or an inside air/outside air double-laminar mode in accordance with a target temperature of air to be blown into the vehicle compartment. Then, the air-conditioning controller outputs a control signal to a driving servomotor of the first and second doors 20, 21, in accordance with the determined air introduction mode.

In the outside air mode in which outside air is introduced into the interior unit, the first door 20 opens the first outside air introduction port 13 and closes the first inside air introduction port 14, and the second door 21 opens the second outside air introduction port 15 and closes the second inside air introduction port 16.

Accordingly, in the outside air mode, outside air introduced from the first and second outside air introduction ports 13, 15 is drawn into the first and second air suction ports 26a, 27a after passing through the filter 19, and is blown to the air conditioning unit from the first and second air blowing outlets 26b, 27b.

In the inside air mode in which inside air is introduced into the interior unit, the first door 20 closes the first outside air introduction port 13 and opens the first inside air introduction port 14, and the second door 21 closes the second outside air introduction port 15 and opens the second inside air introduction port 16.

Accordingly, in the inside air mode, inside air introduced from the first and second inside air introduction ports 14, 16 is drawn into the first and second air suction ports 26a, 27a after passing through the filter 19, and is blown to the air conditioning unit from the first and second air blowing outlets 26b, 27b.

In the inside/outside air double-laminar mode in which outside air is blown by the first fan 24 and inside air is blown by the second fan 25, the first door 20 opens the first outside air introduction port 13 and closes the first inside air introduction port 14, and the second door 21 closes the second outside air introduction port 15 and opens the second inside air introduction port 16.

Accordingly, in the inside/outside air double-laminar mode, outside air introduced from the first outside air introduction port 13 is drawn into the first air suction port 26a via the first air passage 17 after passing through the filter 19, and then is blown to the air conditioning unit from the first air blowing outlet 26b. Simultaneously, inside air introduced from the second inside air introduction port 16 is drawn into the second air suction port 27a via the second air passage 18 after passing through the filter 19, and then is blown to the air conditioning unit from the second air blowing outlet 27b.

According to the present embodiment, because the second air passage 18 is provided substantially independently from the first air passage 17 to be partitioned from the first air passage 17, the first air passage 17 can be straightly formed, and the second air passage 18 can be relatively straightly formed without being largely turned around the first and second casings 26, 27. Therefore, air suction resistance can be reduced in both the first and second fans 24, 25, thereby increasing an air flow amount, and reducing noise and consumption power.

According to the present embodiment, because the first and second outside air introduction ports 13, 15 and the first and second inside air introduction ports 14, 16 are provided at an upper portion of the blower unit 10, air suction noise caused from the air introduction ports 13 to 16 can be shut and reduced by the instrument panel 2. Thus, it can prevent the air suction noise caused from the air introduction ports 13 to 16 from being directly transmitted to a passenger in the occupancy space of the vehicle compartment via an open space under the instrument panel 2.

In the present embodiment, because the first and second air passages 17, 18 are arranged adjacent to each other, air flowing into the first and second air passages 17,18 can be filtered by using the single filter 19, thereby reducing the product cost of the vehicle air conditioner.

Second Embodiment

Figure 3:
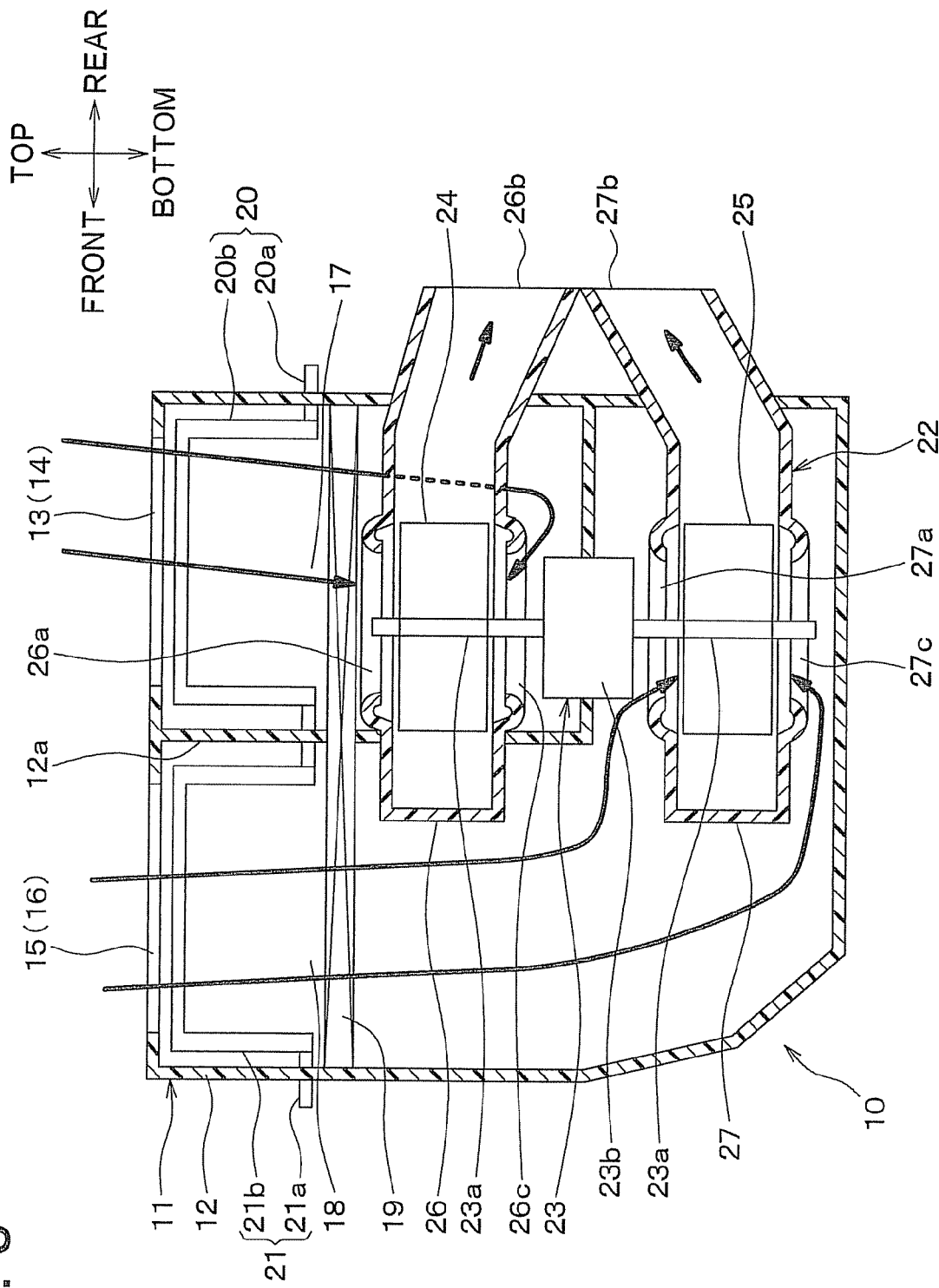
FIG. 3 is a schematic sectional view showing a part of a vehicle air conditioner according to a second embodiment of the present invention.

A second embodiment of the present invention will be described with reference to FIG. 3. In the above-described first embodiment, the electrical motor 23 is a one-side axial motor protruding from the motor body portion 23b to one side in the axial direction, and the first and second fans 24, 25 are located at one side of the electrical motor 23 such that air is drawn from one side in the axial direction in each of the first and second fans 24, 25. In the second embodiment of the present invention, as shown in FIG. 3, an electrical motor 23 is an axial motor with two rotation shafts 23a protruding from the motor body portion 23b to two sides in the axial direction. Furthermore, air is drawn from two sides in the axial direction in each of the first and second fans 24, 25.

In the second embodiment, the first fan 24 is located at one side of the motor body portion 23b in the axial direction, and the second fan 25 is located at the other side of the motor body portion 23b in the axial direction. In the example of the FIG. 3, the first fan 24 is positioned at an upper side of the motor body portion 23b, and the second fan 25 is positioned at a lower side of the motor body portion 23b. In this case, the rotation shafts 23a extend from the motor body portion 23 upwardly and downwardly in the vehicle top-bottom direction.

A first air suction port 26a is provided in one wall surface of the first casing 26 to open toward one axial side adjacent to filter 19, and a second air suction port 26c is provided in another wall surface of the first casing 26 opposite to the one wall surface in the axial direction adjacent to motor body portion 23b. A first air suction port 27a is provided in one wall surface of the second casing 27 to open toward one axial side adjacent to the motor body portion 23b, and a second air suction port 27c is provided in another wall surface of the second casing 27 opposite to the one wall surface in the axial direction. Therefore, as shown in FIG. 3, the first air passage 17 extends from the first inside and outside air introduction ports 13, 14 to the first air suction port 26a and the second air suction port 26c of the first casing 26 without being greatly turned, and the second air passage 18 extends from the second inside and outside air introduction ports 15, 16 to the first air suction port 27a and the second air suction port 27c of the first casing 27 without being greatly turned. Thus, the advantages described in the above first embodiment can be obtained.

In the second embodiment of the present invention, the radial end position (front end position) of the second casing 27 corresponds to the radial end position (front end position) of the first casing 26 without being offset from the first casing 26 in the radial direction. Thus, the diameter of the first fan 24 is substantially equal to the diameter of the second fan 25. However, the radial end position (front end position) of the second casing 27 may be shifted to radial outside of the first casing 26 such that the diameter of the second fan 25 is larger than the diameter of the first fan 24, similarly to the above-described first embodiment. In the second embodiment, the other parts of the vehicle air conditioner may be similar to those of the first embodiment.

Third Embodiment

A third embodiment of the present invention will be described with reference to FIG. 4.

In the above-described first and second embodiments of the present invention, rotary doors are used as the first and second doors 20, 21 for opening and closing the air introduction ports 13 to 16. However, in the third embodiment, plate doors 30, 31 (e.g., butterfly doors) are used as first and second doors 30, 31 for opening and closing the air introduction ports 13 to 16.

Figure 4:
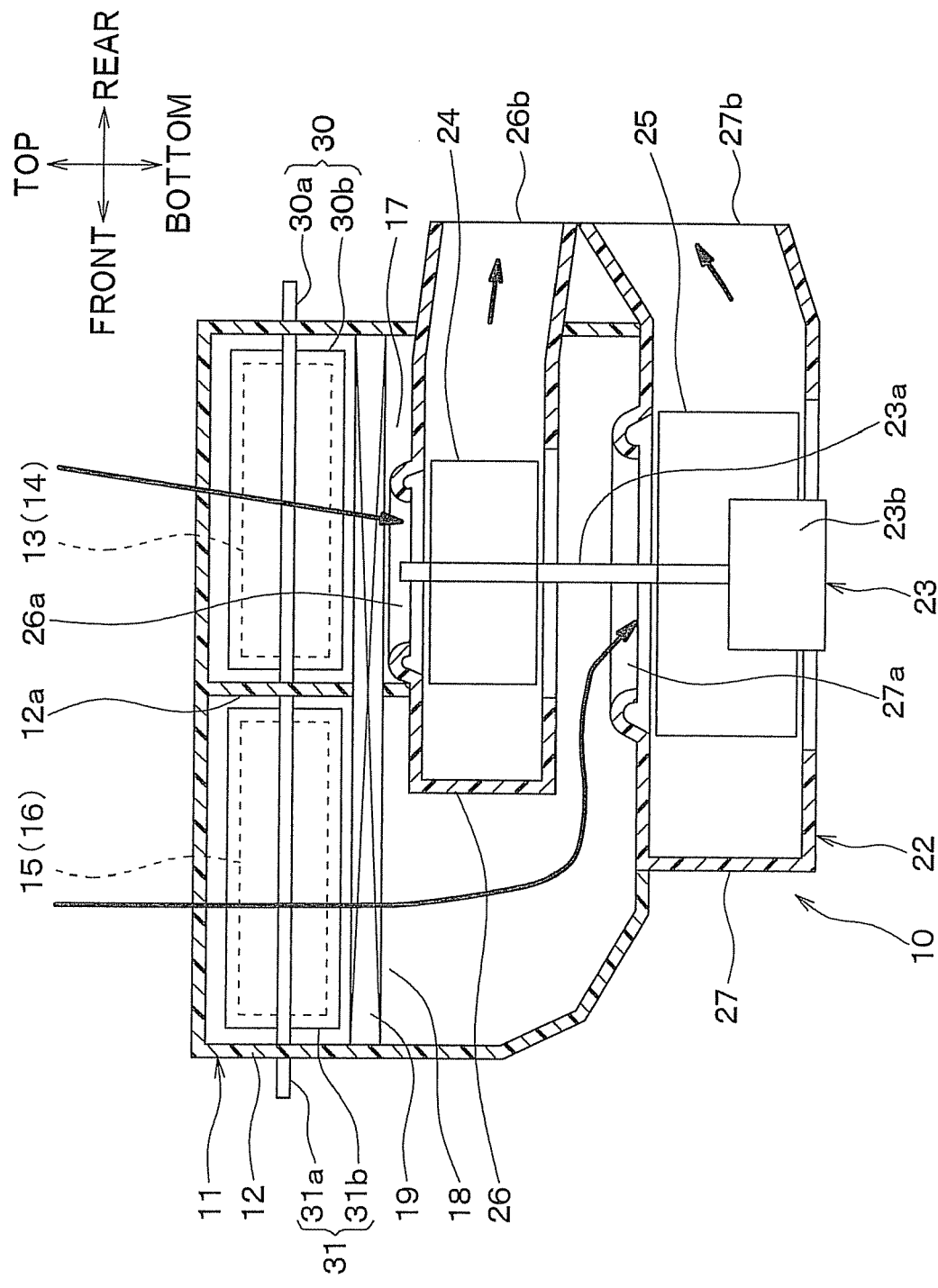
FIG. 4 is a schematic sectional view showing a part of a vehicle air conditioner according to a third embodiment of the present invention.

In the example of FIG. 4, the plate doors 30, 31 are butterfly doors having rotation shafts 30a, 31a at an approximately center of door body portions 30b, 31b. The plate door 30 is located in each of the first outside air introduction port 13 and the first inside air introduction port 14, and the plate door 31 is located in each of the second outside air introduction port 15 and the second inside air introduction port 16.

In the third embodiment, the plate doors 30, 31 may be cantilever doors in which each rotation shaft is positioned at one end portion of a door body portion. In this case, the first outside air introduction port 13 and the first inside air introduction port 14 can be selectively opened and closed by using the single plate door 30, and the second outside air introduction port 15 and the second inside air introduction port 16 can be selectively opened and closed by using the single plate door 31.

In the third embodiment, the other parts of the vehicle air conditioner may be similar to those of the above-described first embodiment or the second embodiment. In the example of FIG. 4, the plate doors 30, 31 are used for the blower unit 10 having the first and second fans 24, 25 located in the first and second casings 26, 27 of the above-described first embodiment. However, the plate doors 30, 31 can be used for the blower unit 10 having the first and second fans 24, 25 located in the first and second casings 26, 27 of the above-described second embodiment.

Fourth Embodiment

A fourth embodiment of the present invention will be now described with reference to FIG. 5. In the fourth embodiment, slide doors 32, 33 are used as first and second doors 32, 33 for opening and closing the air introduction ports 13 to 16. The slide door 32 includes a door body portion 32a formed from a thin plate made of a resin, and a gear mechanism 32b configured to slidably move the door body portion 32a. Similarly, the slide door 33 includes a door body portion 33a formed from a thin plate made of a resin, and a gear mechanism 33b configured to slidably move the door body portion 33a.

Each of the gear mechanisms 32b, 33b includes a rack fixed to the door body portion 32a, 33a, and a pinion engaged with the rack. A part of each door body portion 32a, 33a may be configured by a thin film member. In the fourth embodiment, the other parts are similar to those of the above described first embodiment, and advantages described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments of the present application, outside air is blown by the first fan 24 and inside air is blown by the second fan 25 during the inside/outside air double-laminar mode. However, the blower unit 10 may be configured such that inside air is blown by the first fan 24 and outside air is blown by the second fan 25 during the inside/outside air double-laminar mode.

In the above-described embodiments of the present invention, the first and second outside air introduction ports 13, 15 are arranged in the vehicle front-rear direction, and the first and second inside air introduction ports 14, 16 are arranged in the vehicle front-rear direction. However, the first and second outside air introduction ports 13, 15 may be arranged in the vehicle left-right direction, and the first and second inside air introduction ports 14, 16 may be arranged in the vehicle left-right direction. In this case, the first and second doors for opening and closing the air introduction ports 13 to 16 are also arranged in the vehicle left-right direction.

In the above-described embodiments of the present invention, both the first outside air introduction port 13 and the first inside air introduction port 14 are provided to configure a first air introduction portion, and both the second outside air introduction port 15 and the second inside air introduction port 16 are provided to configure a second air introduction portion. However, the first air introduction portion may be configured by only the first outside air introduction port 13, and the second air introduction portion may be configured by only the second inside air introduction port 16. In this case, the first and second doors for opening and closing the air introduction ports 13, 16 may be omitted.

In the above-described embodiments of the present invention, the axial direction of the blower 22 extends in the vertical direction (top-bottom direction). However, the axial direction of the blower 22 may extend in the horizontal direction, or may extend in a direction tilted from the horizontal direction.

In the above-described embodiments of the present invention, the filter 19 is located to cross both the first and second air passages 17, 18. However, the filter 19 may be omitted. In this case, the air suction port 26a of the first casing 26 of the first blower 24 may be provided to directly open into the first air passage 17 toward the first air introduction port 13, 14.

Figure 5:
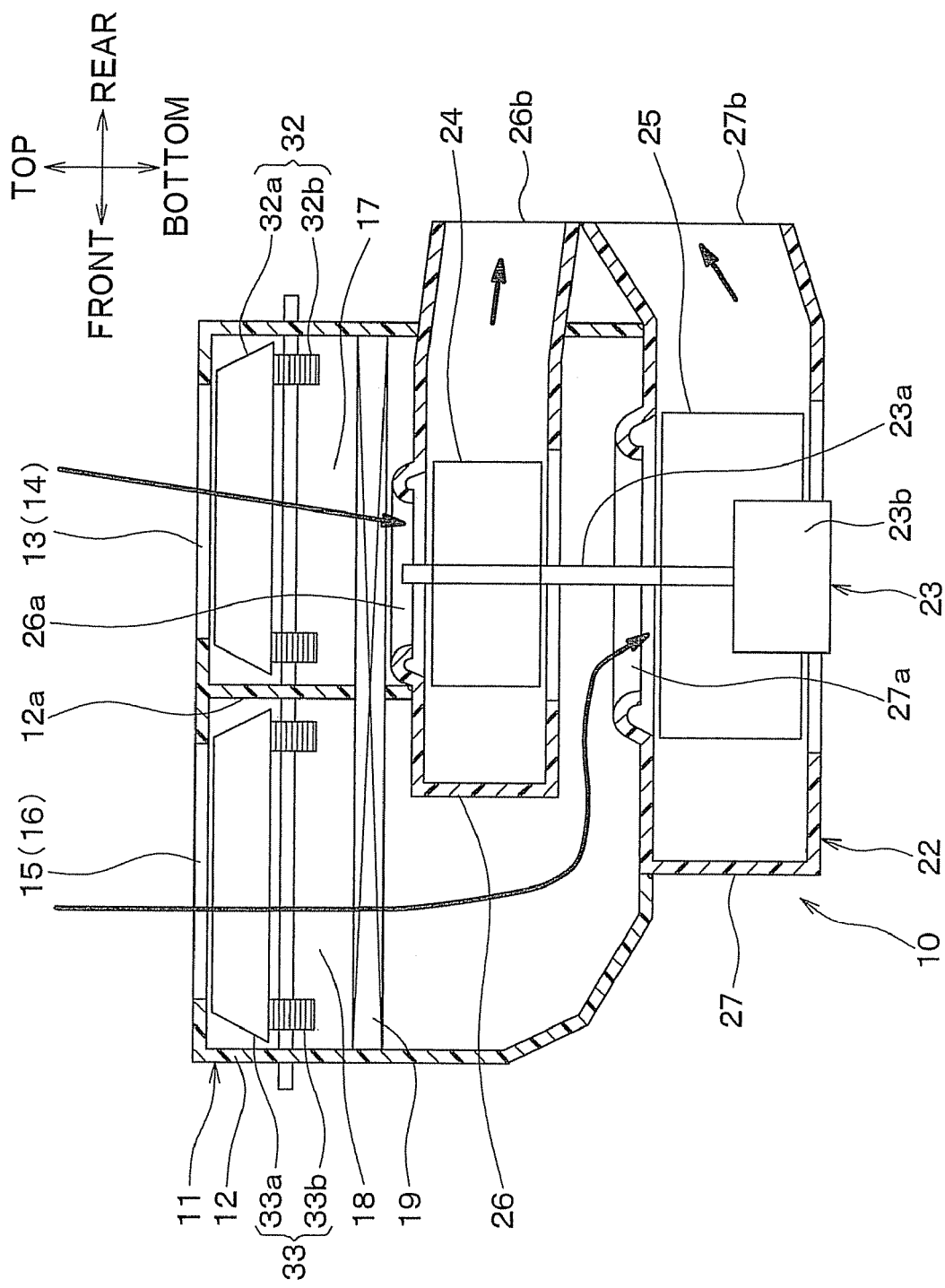
FIG. 5 is a schematic sectional view showing a part of a vehicle air conditioner according to a fourth embodiment of the present invention.

In the above-described examples of the vehicle air conditioner shown in FIGS. 1, 4 and 5, each of the first and second fans 24, 25 is a one-side air suction type in which air is drawn from one side of the fan 24, 25 in the axial direction. In this case, the first air passage 17 extends approximately straightly from the first air introduction portion 13, 14 to the air suction port 26a of the first casing 26. The second fan 25 is located in the second casing 27 having the air suction port 27a opened into the second air passage 18. The second air passage 18 extends approximately straightly from the second air introduction portion 15, 16 to the second casing 27 via a space radially outside of the first casing 26, and is bent radially inside between the first casing 26 and the second casing 27 in the axial direction toward the air suction port 27a of the second casing 27. The configurations of the first air passage 17 and the second air passage 18 are not limited to the examples of FIGS. 1, 4, 5, and may be suitably changed in accordance with the arrangement space of the air conditioner in the vehicle, or the like.

In the example of FIG. 3, the first fan 24 is located in the first casing 26 having two air suction ports 26a, 26c opened into the first air passage 17, from which air is drawn from the two sides of the first fan 24 in the axial direction, and the first air passage 17 extends approximately straightly from the first air introduction portion 13, 14 to the first fan 24. The second fan 25 is located in the second casing 27 having two air suction ports 27a, 27c opened into the second air passage 18, from which air is drawn from the two sides of the second fan 25 in the axial direction. Furthermore, the second air passage 18 extends approximately straightly from the second air introduction portion 15, 16 to a radial outside of the second casing 27, via a space radially outside of the first casing 26, and is bent radially inside toward the two air suction ports 27a, 27c of the second casing 27. The configurations of the first air passage 17 and the second air passage 18 are not limited to the example of FIG. 3, and may be suitably changed in accordance with the arrangement space of the air conditioner in the vehicle, or the like.

Such changes and modifications are to be understood as being within the scope of the present invention as defined by the appended claims.

What is claimed is:
1. An air conditioner for a vehicle, comprising:
a blower including a driving source, and first and second fans driven and rotated by the driving source; and
a case defining a first air introduction portion and a second air introduction portion from which at least one of inside air inside a vehicle compartment and outside air outside the vehicle compartment is introduced into the case, wherein
the first fan and the second fan are arranged on a single common axis defining an axial direction,
the first air introduction portion and the second air introduction portion are arranged at the same side of the first and second fans,
the case has therein a first air inlet passage extending from the first air introduction portion to the first fan, and a second air inlet passage extending from the second air introduction portion to the second fan, and
the first air inlet passage and the second air inlet passage are provided to be independent from each other, the air conditioner further comprising:
a first casing defining an air outlet passage through which air blown by the first fan passes; and
a second casing defining an air outlet passage through which air blown by the second fan passes, wherein
the first casing is provided with a first suction port from which air is drawn to the first fan,
the second casing is provided with a second suction port from which air is drawn to the second fan, the first and second casings are arranged with an open clearance therebetween, the second suction port is open toward the first casing; and the first suction port and the second suction port are both open in a direction toward the same side that the first and second air introduction portions are arranged.

2. The air conditioner for a vehicle according to claim 1, wherein the case is arranged inside of an instrument panel of the vehicle, and the first and second air introduction ports are arranged at an upper side of the first and second fans.

3. The air conditioner for a vehicle according to claim 1, wherein the first air passage and the second air passage are arranged adjacent to each other, the air conditioner further comprising a filter for cleaning air passing therethrough, wherein the filter is arranged in common for both the first air passage and the second air passage.

4. The air conditioner for a vehicle according to claim 1, wherein the first and second air introduction portions are arranged in a vehicle left-right direction.

5. The air conditioner for a vehicle according to claim 1, wherein the first and second air introduction portions are arranged in a vehicle front-rear direction.

6. The air conditioner for a vehicle according to claim 1, wherein the first air introduction portion is configured by a first outside air introduction port for introducing the outside air and a first inside air introduction port for introducing the inside air, and the second air introduction portion is configured by a second outside air introduction port for introducing the outside air and a second inside air introduction port for introducing the inside air, the air conditioner further comprising:

a first door located in the first air passage to selectively open and close the first outside air introduction port and the first inside air introduction port; and a second door located in the second air passage to selectively open and close the second outside air introduction port and the second inside air introduction port.

7. The air conditioner for a vehicle according to claim 6, wherein the first and second doors are rotary doors.

8. The air conditioner for a vehicle according to claim 6, wherein the first and second doors are plate doors.

9. The air conditioner for a vehicle according to claim 6, wherein the first and second doors are slide doors.

10. The air conditioner for a vehicle according to claim 1, wherein each of the first and second fans is a one-side air suction fan configured to draw air from one side of the fan in the axial direction.

11. The air conditioner for a vehicle according to claim 1, wherein each of the first and second fans is a two-sides air suction fan configured to draw air from two sides of the fan in the axial direction.

12. The air conditioner for a vehicle according to claim 10, wherein the first fan is located in the first casing having the first suction port opened into the first air inlet passage, from which the air is drawn from the one side of the first fan in the axial direction, the first air inlet passage extends approximately straight from the first air introduction portion to the first air suction port of the first casing, the second fan is located in the second casing having the second suction port opened into the second air inlet passage, from which the air is drawn from the one side of the second fan in the axial direction, and the second air passage extends approximately straight from the second air introduction portion to the second casing via a space radially outside of the first casing, and is bent radially inside into the clearance between the first casing and the second casing in the axial direction toward the second suction port of the second casing.

13. The air conditioner for a vehicle according to claim 11, wherein the first fan is located in the first casing having a third air suction port opened into the first air inlet passage, from which the air is drawn from two sides of the first fan in the axial direction, the first air inlet passage extends approximately straight from the first air introduction portion to the first fan, the second fan is located in the second casing having a fourth air suction port opened into the second air passage, from which the air is drawn from two sides of the second fan in the axial direction, and the second air inlet passage extends approximately straight from the second air introduction portion to a radial outside of the second casing, via a space radially outside of the first casing, and is bent radially inside toward the second and fourth air suction ports of the second casing.

* * * * *